United States Patent
Urano et al.

(10) Patent No.: US 9,511,622 B2
(45) Date of Patent: Dec. 6, 2016

(54) WHEEL OF VEHICLE

(71) Applicant: HONDA MOTOR CO., LTD., Tokyo (JP)

(72) Inventors: Ryotaro Urano, Wako (JP); Kazuhiro Takatsuka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 129 days.

(21) Appl. No.: 14/464,416

(22) Filed: Aug. 20, 2014

(65) Prior Publication Data

US 2015/0069817 A1 Mar. 12, 2015

(30) Foreign Application Priority Data

Sep. 6, 2013 (JP) .................. 2013-185232

(51) Int. Cl.
| | |
|---|---|
| *B60B 1/06* | (2006.01) |
| *B60T 1/06* | (2006.01) |
| *F16D 65/12* | (2006.01) |
| *B60B 3/10* | (2006.01) |
| *B60B 27/00* | (2006.01) |

(52) U.S. Cl.
CPC .............. *B60B 1/06* (2013.01); *B60T 1/065* (2013.01); *F16D 65/12* (2013.01); *B60B 3/10* (2013.01); *B60B 27/0052* (2013.01)

(58) Field of Classification Search
CPC .......... B60B 1/06; B60B 27/0052; B60B 3/10; F16D 65/12; B60T 1/065
USPC ................. 301/6.9, 64.102, 64.103, 64.104
See application file for complete search history.

(56) References Cited

U.S. PATENT DOCUMENTS

| | | | | |
|---|---|---|---|---|
| 521,148 | A * | 6/1894 | Hayashi | ............... A63H 1/00 446/258 |
| 7,044,272 | B2 * | 5/2006 | Takizawa | ............ F16D 65/12 188/17 |
| 2004/0178029 | A1 * | 9/2004 | Hoyte | ............. F16D 65/12 188/218 XL |
| 2011/0241415 | A1 * | 10/2011 | Mikura | ............. B60B 1/08 301/64.102 |

FOREIGN PATENT DOCUMENTS

JP 2011-213237 A 10/2011

* cited by examiner

*Primary Examiner* — S. Joseph Morano
*Assistant Examiner* — Jean Charleston
(74) *Attorney, Agent, or Firm* — Westerman, Hattori, Daniels & Adrian, LLP

(57) ABSTRACT

A wheel is provided which makes the removal of sand easy at the time of manufacturing the wheel by casting, while realizing the reduction of a weight of the wheel of the vehicle. The wheel of a vehicle includes boss portions which extend in the wheel axial direction from intermediate portions of spoke portions, in the wheel radial direction, and on which a brake disc is mountable. The boss portions are formed with boss inner hollow portions which are continuously formed with spoke inner hollow portions of the spoke portions. Through opening portions which penetrate the spoke portions in the wheel circumferential direction are formed on a portion of the spoke portions on which the boss portions are formed, at the position outside the boss portions, in the wheel radial direction.

6 Claims, 8 Drawing Sheets

WHEEL OF VEHICLE

CROSS-REFERENCE TO RELATED APPLICATIONS

The present application claims priority under 35 U.S.C. §119 to Japanese Patent Application No. 2013-185232, filed Sep. 6, 2013, the contents of which are incorporated herein, by reference, in their entirety.

TECHNICAL FIELD

The present invention relates to a wheel of a vehicle.

BACKGROUND OF THE INVENTION

Recently, with respect to a wheel adopted in a vehicle wheel of a motorcycle or the like, in view of the large size and design properties of a brake disc, there has been proposed a wheel where a boss portion for supporting the brake disc is not formed on a hub portion, and the boss portion is formed on spoke portions (see JP-A-2011-213237, for example). In JP-A-2011-213237, the spoke portions are formed as a solid body, and the boss portion is formed on branched portion on distal end sides of the spoke portions.

SUMMARY OF THE INVENTION

There has been a demand for further reduction of weight also with respect to a wheel where a boss portion is not formed on a hub portion. In an attempt to satisfy such a demand, there has been proposed a technique where a wheel is manufactured by casting and spoke portions are also formed into a hollow body. In this case, however, an amount of sand which forms a core is increased by an amount necessary for forming boss portions and hence, a sand discharge property deteriorates.

Accordingly, a wheel is provided which makes the removal of sand easy at the time of manufacturing a wheel of a vehicle by casting while realizing the reduction of a weight of the wheel of the vehicle.

According to the first aspect, there is provided a wheel of a vehicle which includes: an annular rim portion; a hub portion through which an axle penetrates; and spoke portions which are formed in a hollow shape and connect the rim portion and the hub portion to each other, wherein the wheel further comprises: boss portions which extend in the wheel axial direction from intermediate portions of the spoke portions in the wheel radial direction and on which a brake disc is mountable, the boss portion is formed such that the boss portion has a boss inner hollow portion which is continuously formed with a spoke inner hollow portion of the spoke portion, and a through opening portion which penetrates the spoke portion in the wheel circumferential direction is formed on a portion of the spoke portion on which the boss portion is formed at a position outside the boss portion in the wheel radial direction.

According to a second aspect, a portion of the spoke portion on a side closer to the rim portion than the through opening portion is formed solidly.

According to a third aspect, a one-side opening portion which opens only on one side in the wheel circumferential direction is formed on the spoke portion where the boss portion is not formed out of the plurality of spoke portions.

According to a fourth aspect, a portion of the spoke portion on a side closer to the rim portion than the one-side opening portion is formed solidly.

According to a fifth aspect, the hub portion includes: a cylindrical hub body; and an outer shell portion which forms a hub inner hollow portion continuously formed with the spoke inner hollow portions in an outer peripheral side of the hub body, and ribs which connect the hub body and the outer shell portion to each other are formed in the hub inner hollow portion.

According to the first aspect, a large-sized brake disc having a small weight can be mounted by forming the hollow boss portions on the hollow spoke portions. Further, even when a relatively large sand core including the boss inner hollow portions is used at the time of casting a wheel, molding sand which is produced after the sand core collapses can be smoothly discharged from the through opening portion.

According to the second aspect, a foreign substance such as mud, sand or water cannot stagnate at end portions inside the spoke portions and hence, the foreign substance in the spoke portions can be smoothly discharged from the through opening portion.

According to the third aspect, only a minimum opening portion necessary for supporting a splint or the removal of sand is formed on the spoke portion where the boss portion is not formed and hence, it is possible to easily ensure rigidity of the whole wheel.

According to the fourth aspect, a foreign substance such as mud, sand or water cannot stagnate at end portions inside the spoke portions and hence, the foreign substance in the spoke portions can be smoothly discharged from the one-side opening portion.

According to the fifth aspect, the weight of the hub portion can be reduced while facilitating the connection of the plurality of the spoke portions on the outer periphery of the hub portion by increasing the diameter of the hub portion, and the rigidity of the hub portion can be increased by the ribs.

BRIEF DESCRIPTIONS OF THE DRAWINGS

The advantages of the invention will become apparent in the following description taken in conjunction with the drawings, wherein.

DETAILED DESCRIPTION OF THE INVENTION

Figure 1:
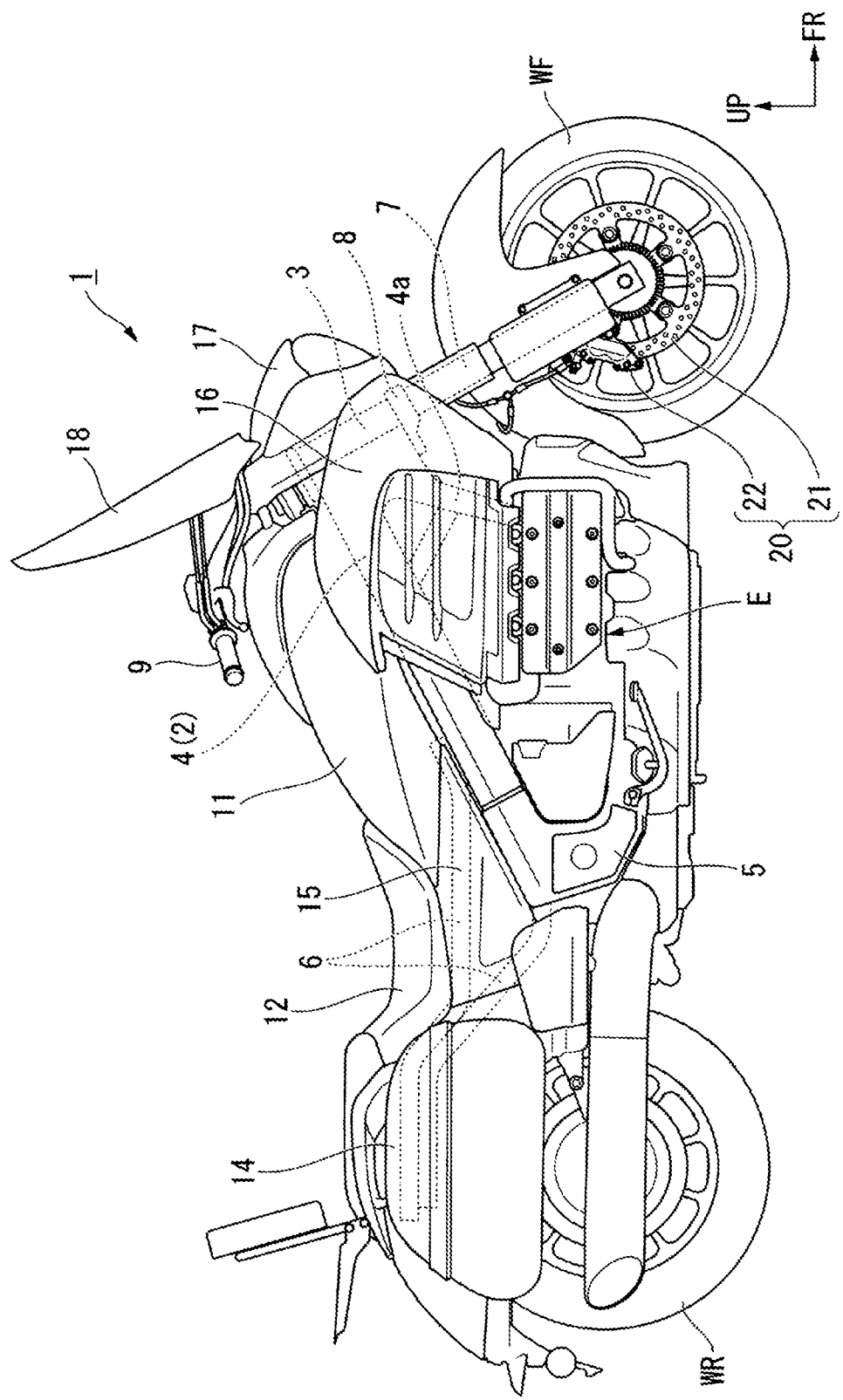
FIG. 1 is a right side view of a motorcycle.

Hereinafter, one embodiment of the invention is explained by reference to drawings. In the explanation made hereinafter, the directions such as frontward and rearward, and leftward and rightward are equal to the respective directions of a vehicle explained hereinafter unless otherwise specified. Further, at appropriate portions in the drawings used for the explanation made hereinafter, an arrow FR which indicates a front side of a vehicle, an arrow LH which indicates a left side of the vehicle, and an arrow UP which indicates an upper side of the vehicle are described.

In a motorcycle 1 shown in a FIG. 1, a front wheel WF of the motorcycle 1 is pivotally supported on lower end portions of a pair of left and right erected front forks 7, and upper portions of the left and right front forks 7 are steerably and pivotally supported on a head pipe 3 mounted on a front end portion of a vehicle body frame 2 by way of a steering stem 8. A bar handle 9 for steering the front wheel is mounted on a top bridge of the steering stem 8.

A pair of left and right main frames 4 extends downward and rearward from the head pipe 3, and upper end portions of a pair of left and right pivot frames 5 are respectively connected to rear end portions of the left and right main frames 4. A water-cooled 4-stroke horizontally-opposed 6-cylinder engine E which constitutes a prime mover of the motorcycle 1 is mounted on a lower side of the left and right main frames 4 and on a front side of the left and right pivot frames 5. In the drawing, symbol 4a indicates an engine hanger which extends downward from front end portions of the left and right main frames 4 and supports a front end portion of the engine E.

The left and right pivot frames 5 pivotally support, in a vertically swingable manner, a front end portion of a swing arm (not shown in the drawing)which pivotally supports a rear wheel WR at a rear end portion thereof. The swing arm allows a drive shaft (not shown in the drawing) extending from the engine E, for example, to pass therethrough. The transmission of power between the engine E and the rear wheel WR can be performed by way of the drive shaft.

A front end portion of the rear frame 6 which supports a seat 12, on which a rider is seated, is connected to rear portions of the left and right main frames 4 and the left and right pivot frames 5. A tank cover 11 which constitutes an exterior part is arranged in front of the seat 12. A fuel tank (not shown in the drawing) which extends to the inside of a rear portion of the tank cover 11 is arranged below a front portion of the seat 12. In the inside of a front portion of the tank cover 11 in front of the fuel tank, an air cleaner (not shown in the drawing) for filtering intake air supplied to the engine E is arranged.

Left and right saddle bags 14 are arranged on both sides of a lower portion of a rear portion of the seat 12. Left and right side covers 15 are arranged on both sides of a lower portion of a front portion of the seat 12. Left and right front side covers 16 which extend frontward up to a position where the left and right front side covers 16 overlap with the front folk 7, as viewed in side view, are arranged on both sides of a lower portion of a front portion of the tank cover 11. A radiator having a thick plate shape (not shown in the drawing) which is approximately orthogonal to the lateral direction (vehicle width direction) is arranged on inner sides of the left and right front side covers 16. A lamp cowl 17 which covers the periphery of a head lamp and the like, and a window screen 18 which is erected in front of a rider are supported on the steering stem 8.

Figure 2:
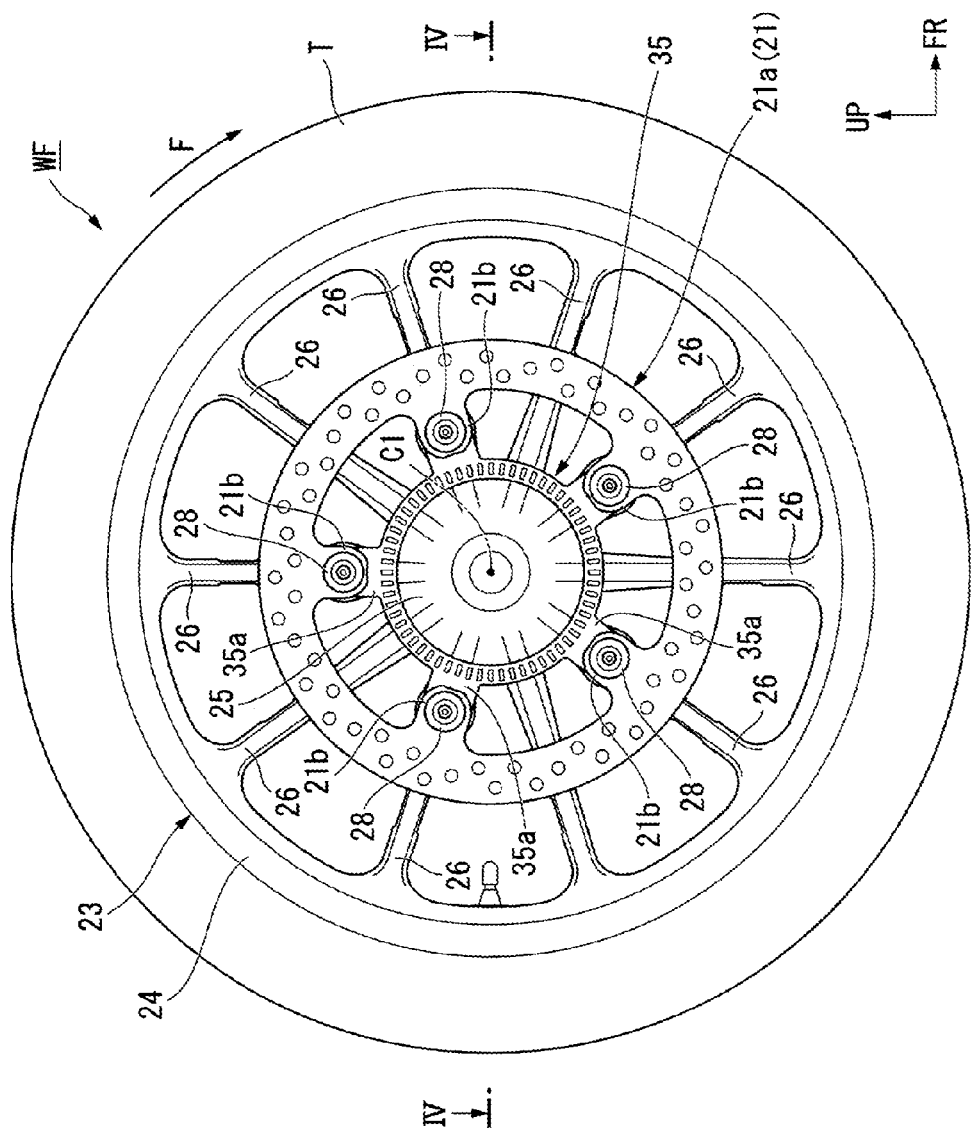
FIG. 2 is a right side view of a front wheel of the motorcycle.
Figure 3:
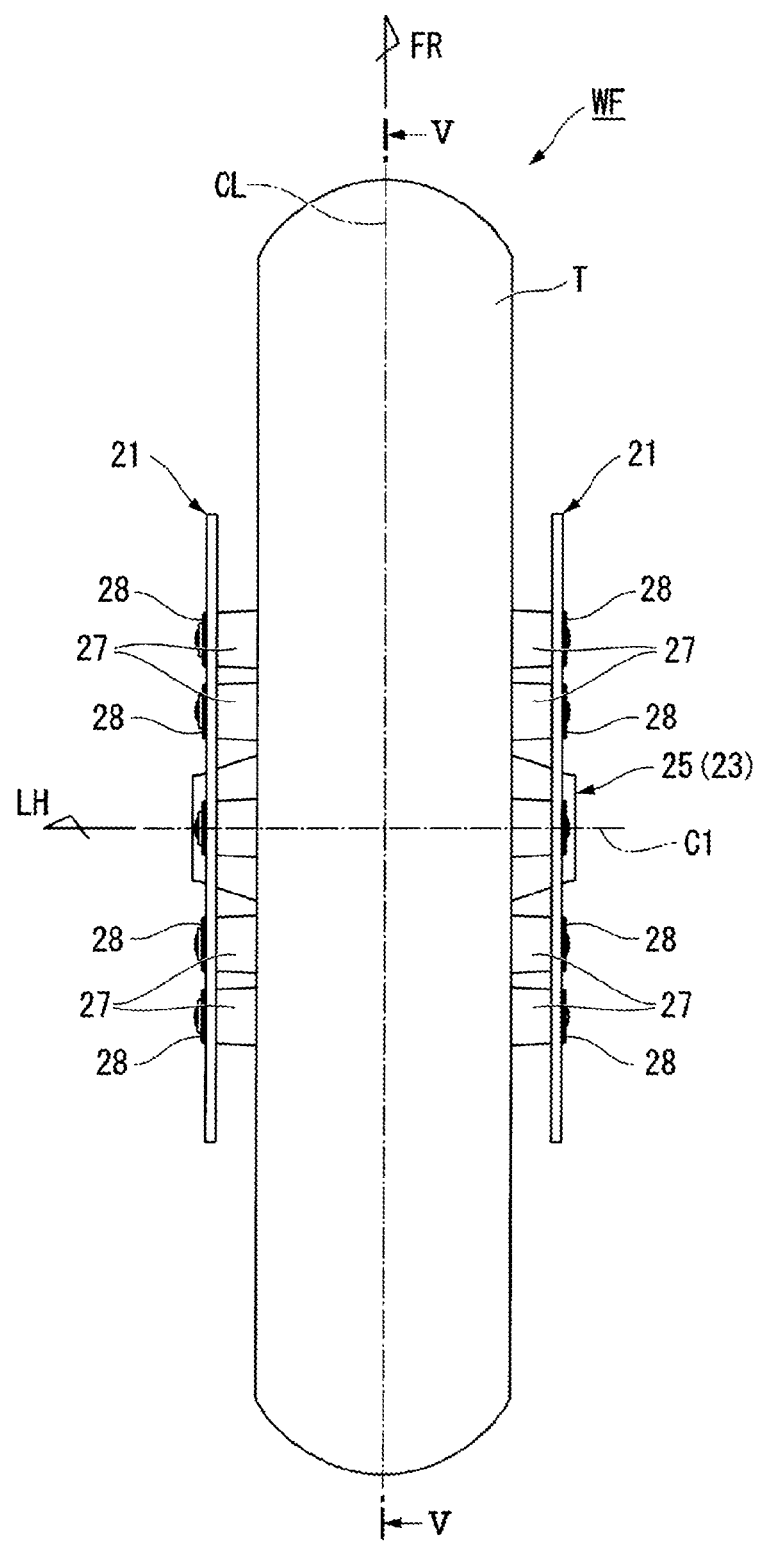
FIG. 3 is a top plan view of the front wheel.

Also by reference to FIG. 2 and FIG. 3, a pair of left and right brake discs 21 is supported on both left and right sides of a wheel 23 of the front wheel WF in an integrally rotatable manner. A pair of left and right brake calipers 22 which clamps left and right brake discs 21 respectively is fixedly supported on rear sides of lower portions of the left and right front forks 7. A pair of left and right front brakes 20 is constituted of the left and right brake discs 21 and the left and right brake calipers 22.

The brake disc 21 includes: an annular disc body 21a which has a circular plate shape where a center portion is opened and is clamped by the brake caliper 22, and a plurality of lugs to be supported 21b which are formed in a projecting manner on an inner peripheral side of the disc body 21a. The plurality of lugs to be supported 21b are supported on boss portions 27 formed on a plurality of spoke portions 26 of the wheel 23 respectively by way of floating pins 28. Due to such a constitution, the brake disc 21 is directly mounted on the wheel 23 by a floating mount.

That is, compared to a brake disc 21 which is supported on the hub portion 25 of the wheel 23 by way of an inner disc, the brake disc 21 of this embodiment can eliminate the inner disc and hence, the brake disc 21 can realize the reduction of weight and provides a unique external appearance while increasing an effective diameter of the disc.

A lug to be supported 35a on an outer peripheral side of a pulser ring 35 of a wheel speed sensor is also supported on the boss portion 27 by a floating pin 28.

By reference to FIG. 2 to FIG. 5, the wheel 23 of the front wheel WF is a cast wheel which is an integrally formed body consisting of: an annular rim portion 24 on which a tire T is mounted; a hub portion 25 through which a front axle passes; and the plurality of spoke portions 26 which extend between the rim portion 24 and the hub portion 25. The wheel 23 can be made of aluminum or a light alloy such as an aluminum alloy. With respect to the wheel 23, spoke inner hollow portions 26a and a hub inner hollow portion 25a are respectively formed in the respective spoke portions 26 and the hub portion 25 thus also structurally reducing the weight of the wheel 23.

Hereinafter, the axial direction (the vehicle width direction in a vehicle mounted state) of the wheel 23 is referred to as the wheel axial direction, the radial direction of the wheel 23 is referred to as the wheel radial direction, and the circumferential direction of the wheel 23 is referred to as the wheel circumferential direction. An axis of the center of the rotation of the wheel 23 is indicated by a line C1, and the frontward rotational direction (the rotational direction when the vehicle advances) of the wheel 23 in a vehicle mounted state is indicated by an arrow F. An axial center line of the wheel 23 in a vehicle mounted state and in a state where a steering angle is zero degrees and aligns with a lateral center line of a vehicle body. The axle center line is expressed as a line CL.

Figure 4:
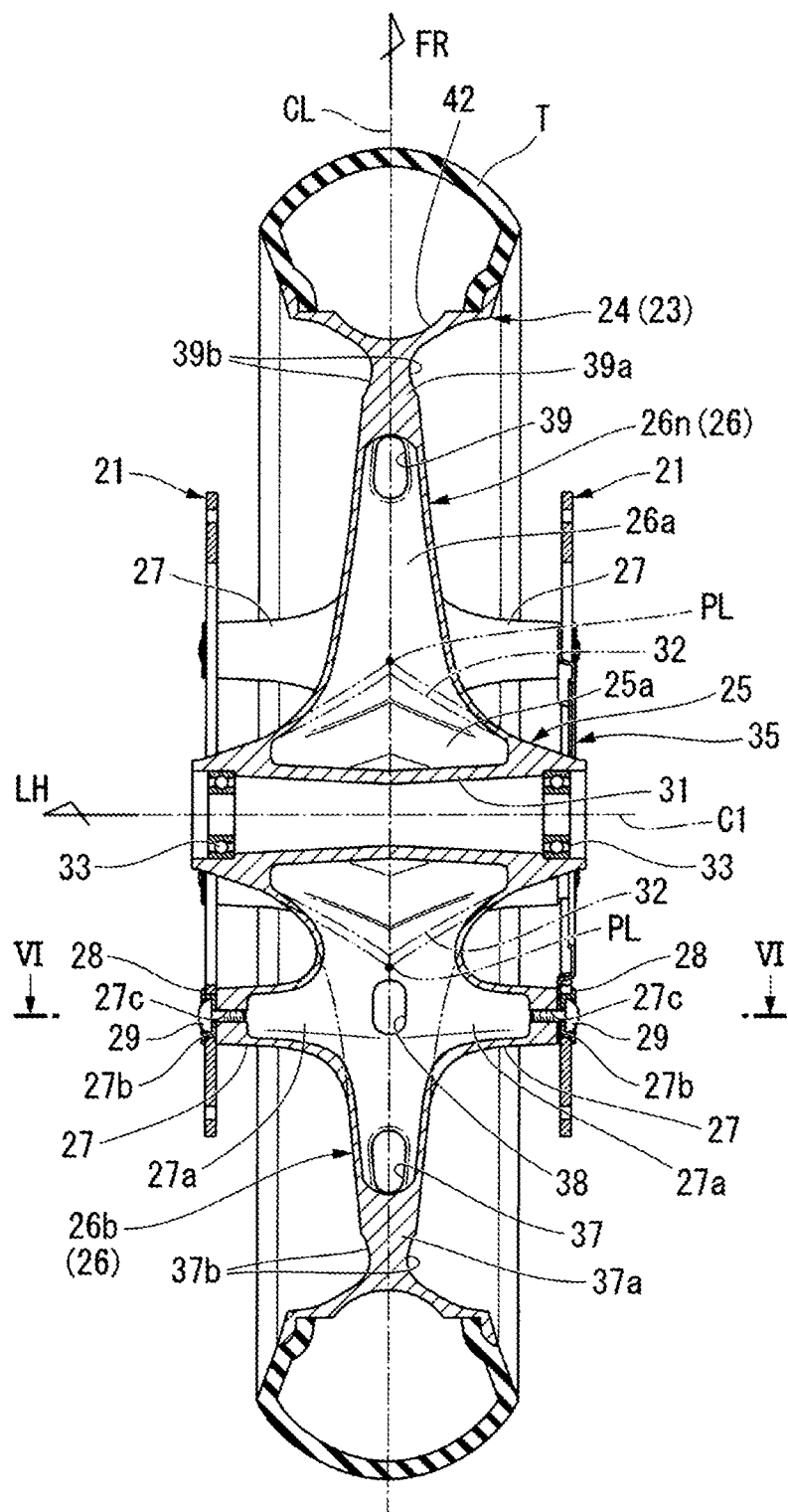
FIG. 4 is a cross-sectional view taken along a line IV-IV in FIG. 2.
Figure 5:
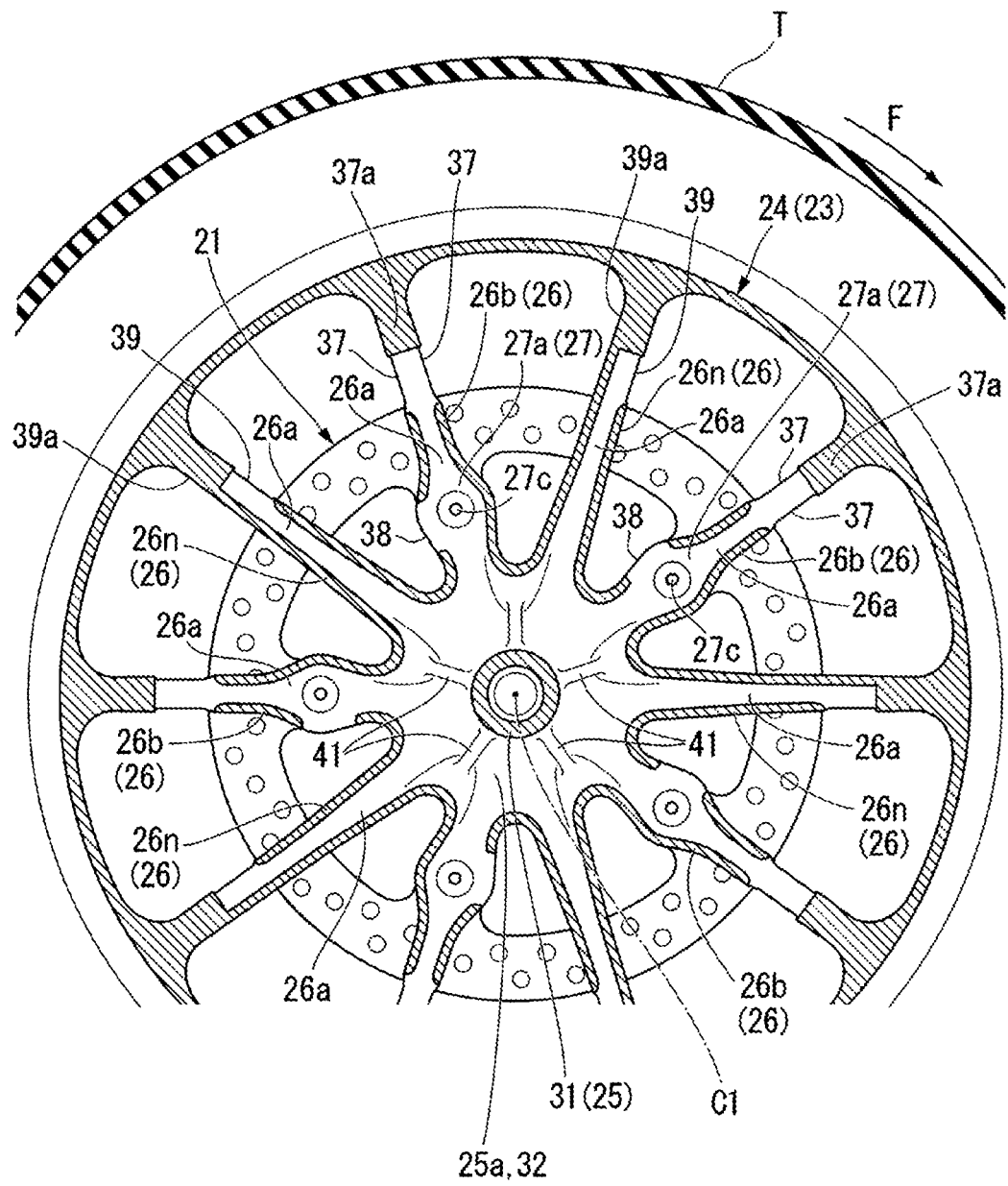
FIG. 5 is a cross-sectional view taken along a line V-V in FIG. 3.

By reference to FIG. 4 and FIG. 5, the hub portion 25 includes: a cylindrical hub body 31 which extends in the wheel axial direction while straddling the axial center line CL of the wheel 23 in the lateral direction; and an outer shell portion 32 which is formed on an outer peripheral side of the hub body 31 with the hub inner space portion formed therein.

In the hub body 31, a wheel bearing 33 is press-fitted into end portions on both sides of the hub body in the wheel axial direction, and the hub body 31 is rotatably supported on the front axle by way of these wheel bearings 33.

The outer shell portion 32 is formed such that a diameter of the outer shell portion 32 is gradually enlarged towards the axial center line CL from both ends of the hub body 31, in the wheel axial direction. The plurality of spoke portions 26 extend from the inside of an outer shell portion 32, in the wheel axial direction, in a tapered manner toward the outside in the wheel radial direction.

For example, ten spoke portions 26 are arranged equidistantly in the wheel circumferential direction. Out of these plurality of spoke portions 26, on several spoke portions 26 which are arranged equidistantly in the wheel circumferential direction (five spoke portions 26 in total which are arranged every one other in this embodiment), a boss portion 27 for mounting the brake disc 21 is formed respectively such that the boss portion 27 is formed on an intermediate portion of each spoke portion 26 in the longitudinal direction (wheel radial direction) at a position close to the hub portion 25. Hereinafter, the spoke portions 26 on each of which the boss portion 27 is formed may be also referred to as the boss-equipped spoke portions 26b and the spoke portions 26 on each of which the boss portion 27 is not formed other than the boss-equipped spoke portions 26b may be also referred to as boss non-equipped spoke portions 26n.

The spoke portion 26 has an approximately rectangular cross section, and is formed such that the cross-sectional shape of the spoke portion 26 is decreased toward a rim portion 24 side. The outer shell portion 32 of the hub portion 25 is formed into a crest shape where a parting line PL which extends along a split surface of a mold at the center of the wheel 23 in the axial direction respectively forms a peak portion (see FIG. 4).

A mark 42 indicative of the heavy point (or the light point) of the wheel 23 is formed on a right side of a recessed groove formed on a portion of the rim portion 24 which faces the inside of the tire T (see FIG. 4). Usually, a tire exchange operation is performed in a state where a left side of the wheel 23 is directed upward and hence, due to the above-mentioned arrangement, the mark 42 can be easily visually recognized so that the light point (or the heavy point) of the tire T can be easily aligned with the position of the mark 42.

At a portion of the intermediate portion of the boss-equipped spoke portion 26b in the longitudinal direction, a through opening portion 37 is formed such that the through opening portion 37 penetrates wall portions of the boss-equipped spoke portion 26b on both sides, in the wheel circumferential direction. Due to the formation of through opening portion 37, a distal end of the spoke inner hollow portion 26a formed in the boss-equipped spoke portion 26b is opened on both sides of the boss-equipped spoke portion 26b in the wheel circumferential direction. Accordingly, a sand removing property after casting can be enhanced and, at the same time, property of discharging rain or the like which intrudes into the spoke inner hollow portion 26a can be enhanced. A portion of the boss-equipped spoke portion 26b which is disposed more outside in the wheel radial direction than the through opening portion 37 is formed into a solid portion 37a having no hollow portion. A neck portion 37b for suppressing the generation of "a blowhole" is formed on both sides of the solid portion 37a in the wheel axial direction (see FIG. 4).

Figure 6:
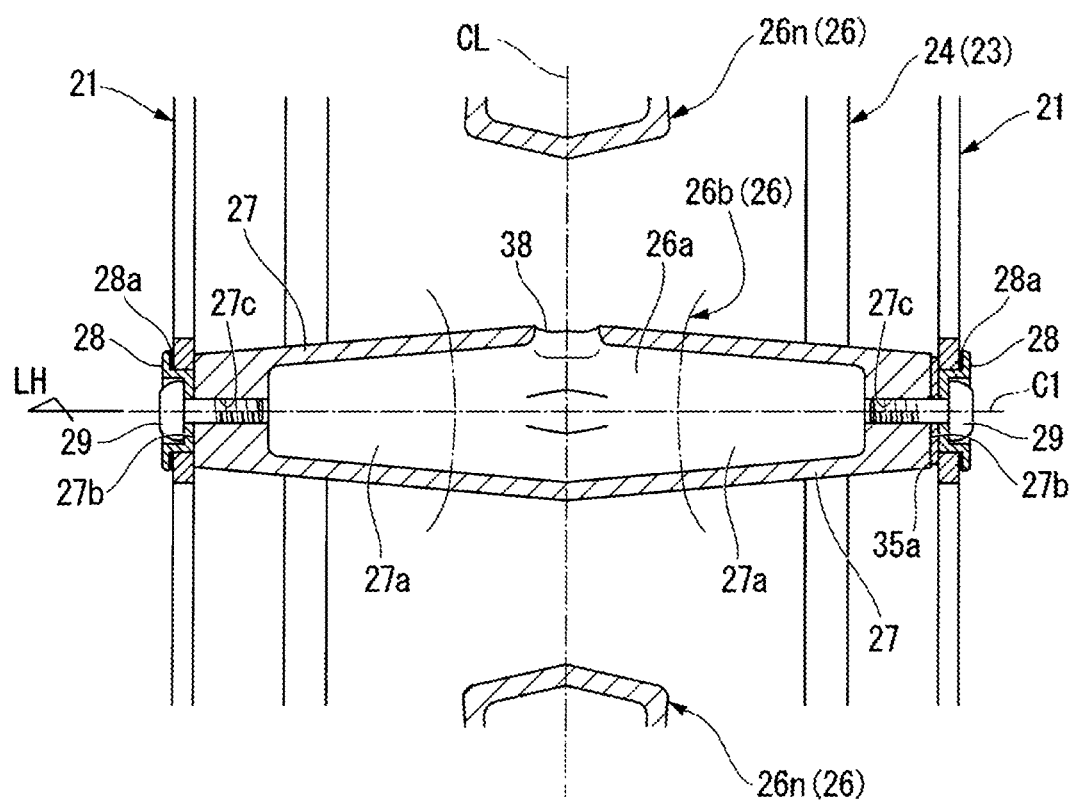
FIG. 6 is a cross-sectional view taken along a line VI-VI in FIG. 4.

Also by reference to FIG. 6, at a portion of the intermediate portion of the boss-equipped spoke portion 26b in the longitudinal direction which is disposed at the same position in the radial direction as the boss portion 27, an intermediate opening portion 38 is formed in a side wall portion of the portion on one side in the wheel circumferential direction (for example, on a side opposite to the wheel forwardly rotating direction). A space formed in the boss-equipped spoke portion 26b between the boss portions 27 is opened at one side of the boss-equipped spoke portion 26b in the wheel circumferential direction through the intermediate opening portion 38. Accordingly, a gas removing property at the time of casting and a sand removing property after casting can be enhanced. The intermediate opening portion 38 may be formed at both sides of the boss-equipped spoke portion 26b in the wheel circumferential direction. In the drawing, symbol 29 indicates fastening bolts which fasten the floating pin 28 to the boss portion 27, and symbol 28a indicates a wave washer sandwiched between a flange of the floating pin 28 and outer surface of the brake disc 21.

Further, at a portion of the intermediate portion of the boss non-equipped spoke portion 26n in the longitudinal direction which is close to the rim portion 24, a one-side opening portion 39 is formed in a side wall portion of the portion on one side in the wheel circumferential direction (wheel frontwardly rotating side). Due to the formation of the one-side opening portion 39, a distal end of the spoke inner hollow portion 26a formed in the boss non-equipped spoke portion 26n is opened on the one side of the boss non-equipped spoke portion in the wheel circumferential direction. Accordingly, sand removing property after casting can be enhanced and, at the same time, property of discharging rain or the like which intrudes into the spoke inner hollow portion 26a can be enhanced. A portion of the boss non-equipped spoke portion 26n outside the one-side opening portion 39 in the wheel radial direction is formed into a solid portion 39a in the same manner as the boss-equipped spoke portion 26b, and a neck 39b is formed on both sides of the solid portion 39a in the wheel axial direction.

Respective hollow portions 25a, 26a and 27a of the wheel 23 are formed using a sand core at the time of forming (casting) the wheel 23 using a mold (casting mold). The sand core includes a splint for setting the sand core in the mold, and the splint is sandwiched between a fixed mold and a movable mold which form the mold and hence, the sand core is held in the inside of a cavity formed in the mold.

The sand core includes a core body which is formed into a shape corresponding to the respective hollow portions 25a, 26a and 27a by baking molding sand covered with a tacky material or the like, and the splint which is provided for holding the core body in the inside of the cavity of the mold (neither shown in the drawing). The sand core collapses by applying vibrations or the like to the sand core after casting the wheel 23, and collapsed sand is discharged to the outside of the wheel 23 using the respective opening portions 37, 38 and 39 formed corresponding to the splint as sand removing holes.

The elongated spoke inner hollow portion 26a formed in the boss-equipped spoke portion 26b is communicated with the boss inner hollow portions 27a formed in the boss portions 27 at both sides of the spoke inner hollow portion 26a in the wheel axial direction. Although these respective hollow portions 26a, 27a are formed integrally using a relatively large sand core, a gas or vapor generated from the sand core at this point of time can be favorably discharged from the respective opening portions 37 and 38.

Figure 7:
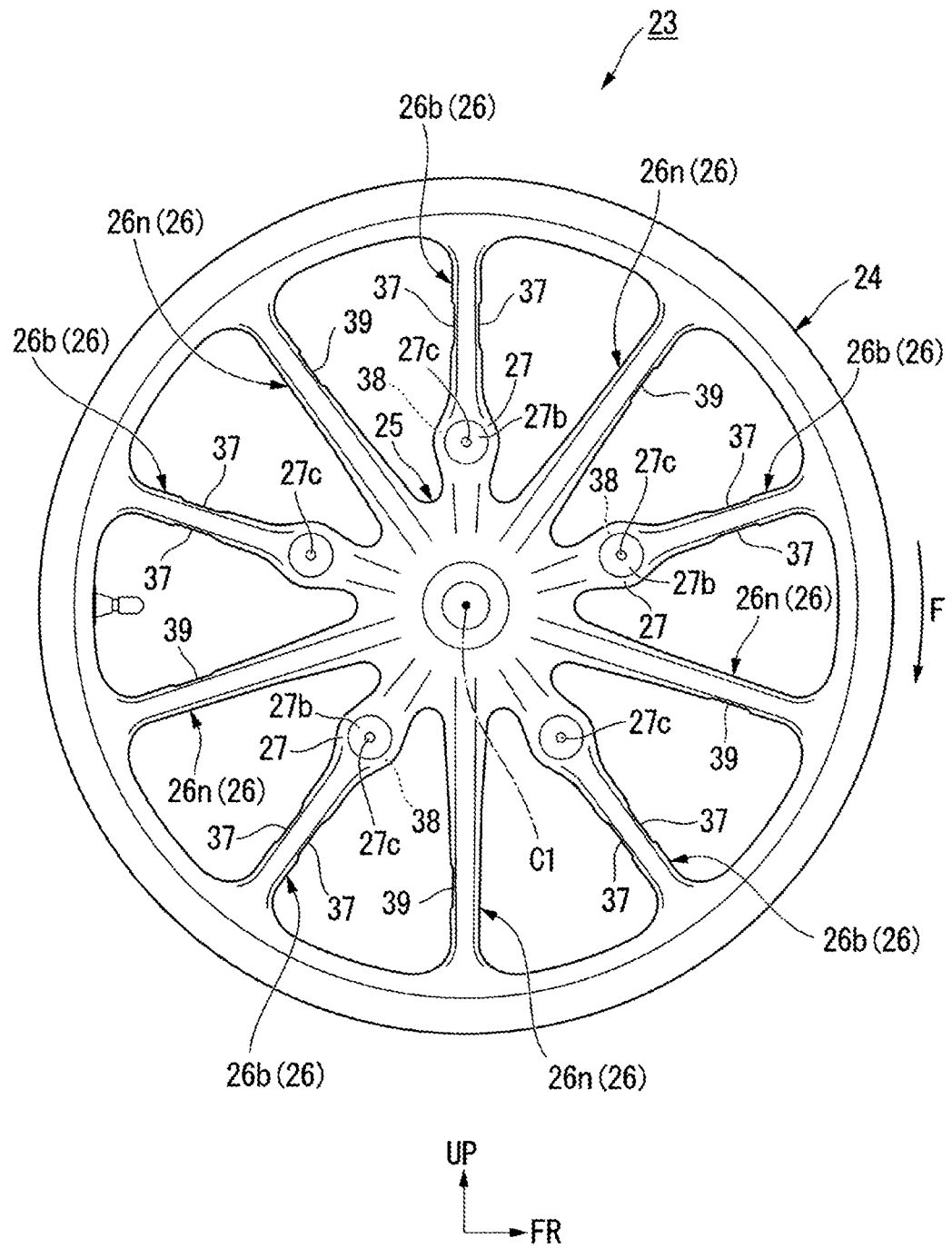
FIG. 7 is a right side view of a wheel of the front wheel.

Also by reference to FIG. 7, although end surfaces 27b of both boss portions 27 outside in the wheel axial direction and bolt holes 27c are formed with predetermined accuracy by machining or the like after casting the wheel 23, by forming original holes for forming the bolt holes 27c at distal ends of the boss portions 27c, the original holes can be also used for removing a gas or removing sand.

Figure 8:
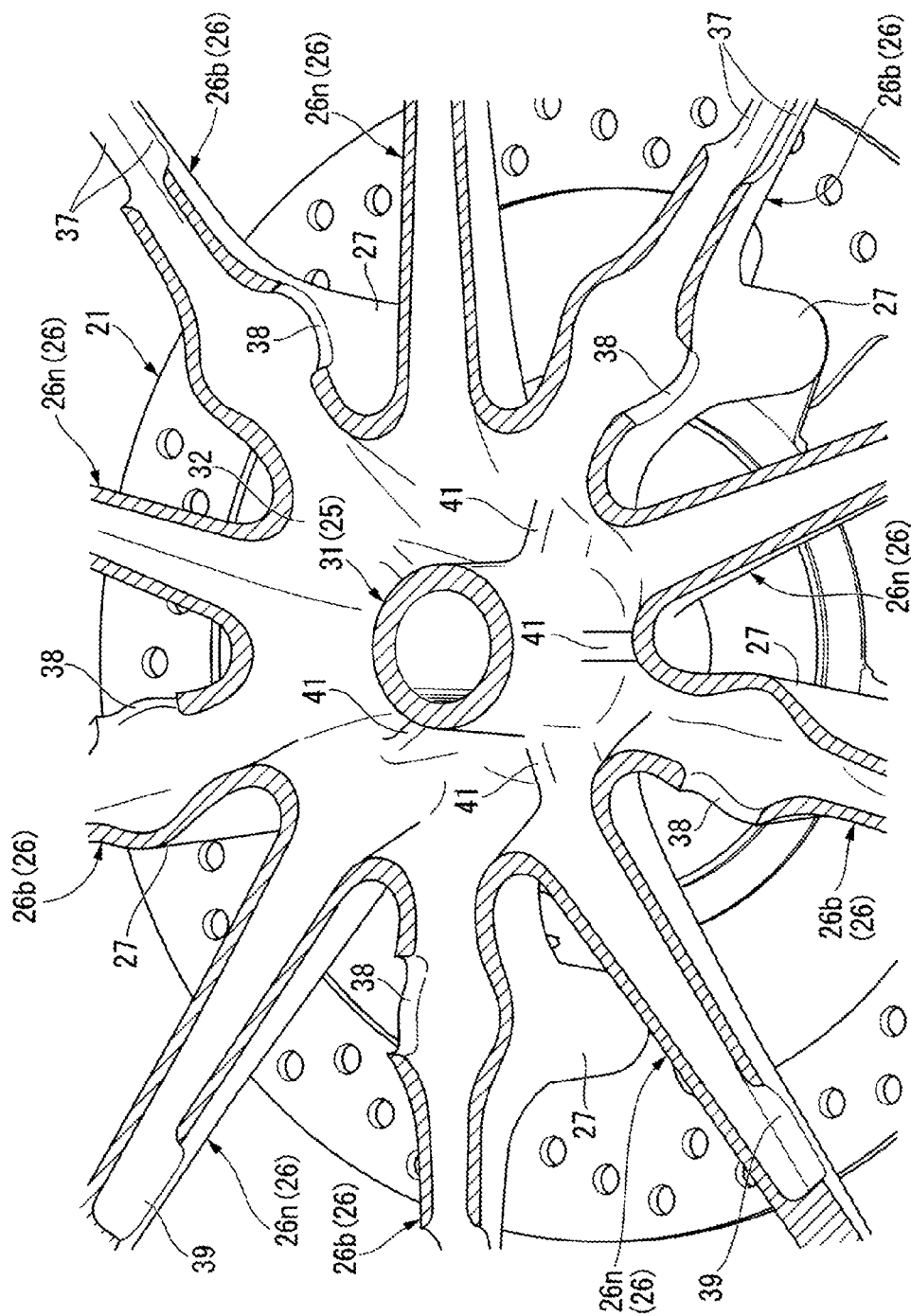
FIG. 8 is a perspective view of the wheel including a cross section of the wheel.

Also by reference to FIG. 8, the hub inner hollow portion 25a of the hub portion 25 communicates with the spoke inner hollow portions 26a of the spoke portions 26. Outside the hub inner hollow portion 25a of the hub portion 25 in the wheel axial direction, and between the boss-equipped spoke portion 26b and the boss non-equipped spoke portion 26n on a wheel frontwardly rotating direction side of the boss-equipped spoke portion 26b in the wheel circumferential direction, a plate-shaped rib 41 which is approximately orthogonal to the wheel circumferential direction is formed respectively. By forming a plurality of (for example, five in total) ribs 41 in this manner, the flow of molten steel at the time of casting can be enhanced and, at the same time, rigidity of the hub portion 25 is increased.

As has been explained heretofore, the wheel 23 according to the above-mentioned embodiment includes the annular rim portion 24, the hub portion 25 which an axle penetrates; and the spoke portions 26 which are formed in a hollow shape and connect the rim portion 24 and the hub portion 25 to each other. The wheel further includes the boss portions 27 which extend in the wheel axial direction from intermediate portions of the spoke portions 26, in the wheel radial direction, and on which the brake disc 21 is mountable. The boss portion 27 is formed with the boss inner hollow portion 27a, which is continuously formed with the spoke inner hollow portion 26a of the spoke portion 26. The through opening portion 37 which penetrates the spoke portion 26 in the wheel circumferential direction is formed on the portion of the spoke portion 26 on which the boss portion 27 is formed, at the position outside the boss portion 27 in the wheel radial direction.

Due to such a constitution, a large-sized brake disc 21 having a small weight can be mounted by forming the hollow boss portions 27 on the hollow spoke portions 26. Further, even when a relatively large sand core including the boss inner hollow portion 27a is used at the time of casting the wheel 23, molding sand which is produced after the sand core collapses can be smoothly discharged from the through opening portion 37.

Further, the intermediate opening portion 38, which opens in the wheel circumferential direction, is formed on the portion of the wheel 23 which has the same wheel radial directional position as the boss portion 27 of the spoke portion 26 where the boss portion 27 is formed. Accordingly, after the sand core collapses, molding sand can be smoothly discharged particularly from an area in the vicinity of the boss portion 27 where an amount of molding sand is large. It is also possible to favorably ensure gas removing property when an adhesive agent for solidifying the sand core, moisture contained in the sand core and the like are gasified at the time of casting.

Further, the wheel 23 is configured such that the pair of boss portions 27 is formed for every spoke in the wheel axial direction such that the boss portion 27 extends on both sides in the wheel axial direction, and the intermediate opening portion 38 is formed between the pair of boss portions 27 so that it is possible to ensure both sand removing property and gas removing property of the boss portions 27 on both sides in the wheel axial direction in a well-balanced manner.

Further, the wheel 23 is configured such that the solid portion 37a is formed in the spoke portion 26 on a side closer to the rim portion 24 than the through opening portion 37, so that a foreign substance such as mud, sand or water cannot stagnate at the end portions inside the spoke portions 26 and hence, the foreign substance in the spoke portions 26 can be smoothly discharged from the through opening portions 37.

Further, the wheel 23 is configured such that one-side opening portion 39, which opens only on one side in the wheel circumferential direction, is formed on the spoke portion 26 where the boss portion 27 is not formed, among the plurality of spoke portions 26. Thus, only the minimum opening portion necessary for supporting the splint or the removal of sand is formed on the spoke portions 26 where the boss portion 27 is not formed. Hence, it is possible to easily ensure rigidity of the whole wheel 23.

Further, the wheel 23 is configured such that the solid portion 39a is formed in the spoke portion 26 at a portion on a side closer to the rim portion 24 than the one-side opening portion 39, so that a foreign substance such as mud, sand or water cannot stagnate at the end portions inside the spoke portions 26. Hence, the foreign substance in the spoke portions 26 can be smoothly discharged from the one-side opening portions 39.

Further, the wheel 23 is configured such that the hub portion 25 includes the cylindrical hub body 31, and the outer shell portion 32 which forms the hub inner hollow portion 25a, continuously formed with the spoke inner hollow portions 26a in the outer peripheral side of the hub body 31. The ribs 41 which connect the hub body 31 and the outer shell portion 32 to each other are formed on the hub inner hollow portion 25a so that the weight of the hub portion 25 can be reduced while facilitating the connections of the plurality of the spoke portions 26 on the outer periphery of the hub portion 25 by increasing the diameter of the hub portion 25, and the rigidity of the hub portion 25 can be increased by the ribs 41.

The invention is not limited to the above-mentioned embodiment, and is preferably applicable to a saddle-ride-type vehicle such as a motorcycle, for example. Further, the saddle-ride-type vehicle covers vehicles in general where a rider is seated while straddling over a vehicle body. That is, the saddle-ride-type vehicle includes not only motorcycles (including bicycles with a prime mover and scooter-type vehicles) but also three-wheeled vehicles and four-wheeled vehicles. The three-wheeled vehicles include a vehicle having one vehicle wheel on a front side and two vehicle wheels on a rear side, and also a vehicle which includes two vehicle wheels on a front side and one vehicle wheel on a rear side.

The invention is also applicable to other vehicle wheels such as a rear wheel in place of the front wheel. The wheel may have the constitution where all spoke portions formed on the wheel are constituted as boss-equipped spoke portions. The wheel may have the constitution where the intermediate opening portion 38 is formed on at least one of a portion of the boss-equipped spoke portion 26b at the same position in the wheel radial direction as the boss portion 27.

The constitution of the above-mentioned embodiment merely constitutes one example of the invention and various modifications are conceivable without departing from the gist of the invention such as the replacement of the constitutional elements of the embodiment with well-known constitutional elements.

We claim:

1. A wheel of a vehicle, comprising:
   an annular rim portion;
   a hub portion through which an axle is adapted to penetrate; and
   a plurality of spoke portions which connect said rim portion and said hub portion to each other and which comprise a spoke inner hollow portion,
   wherein at least one boss-equipped spoke portion, among said plurality of spoke portions, comprises boss portions which extend in a wheel axial direction from an intermediate portion of said boss-equipped spoke portion in the wheel radial direction, said boss portions being adapted to mount a brake disc thereto,
   wherein said boss portions comprise a boss inner hollow portion which is continuously formed with said spoke inner hollow portion of said boss-equipped spoke portion,
   wherein a through opening portion is formed in said boss-equipped spoke portion, at a position outside said boss portions in the wheel radial direction, wherein said through opening portion penetrates said boss-equipped spoke portion in the wheel circumferential direction, and wherein a portion of said boss-equipped spoke portion on a side closer to said rim portion than said through opening portion is solid.

2. The wheel of a vehicle according to claim 1, wherein a one-side opening portion, which opens only on one side in the wheel circumferential direction, is formed on a non-boss-equipped spoke portion, among said plurality of spoke portions.

3. The wheel of a vehicle according to claim 2, wherein a portion of said non-boss-equipped spoke portion on a side closer to said rim portion than said one-side opening portion is solid.

4. The wheel of a vehicle according to claim 3,
wherein said hub portion comprises:
   a cylindrical hub body; and
   an outer shell portion which forms a hub inner hollow portion continuously formed with said spoke inner hollow portions in an outer peripheral side of said hub body, and
wherein ribs which connect said hub body and said outer shell portion to each other are formed in said hub inner hollow portion.

5. The wheel of a vehicle according to claim 2,
wherein said hub portion comprises:
   a cylindrical hub body; and
   an outer shell portion which forms a hub inner hollow portion continuously formed with said spoke inner hollow portions in an outer peripheral side of said hub body, and
wherein ribs which connect said hub body and said outer shell portion to each other are formed in said hub inner hollow portion.

6. The wheel of a vehicle according to claim 1,
wherein said hub portion comprises:
   a cylindrical hub body; and
   an outer shell portion which forms a hub inner hollow portion continuously formed with said spoke inner hollow portions in an outer peripheral side of said hub body, and
wherein ribs which connect said hub body and said outer shell portion to each other are formed in said hub inner hollow portion.

* * * * *